United States Patent
Yoder et al.

(10) Patent No.: US 9,141,419 B1
(45) Date of Patent: Sep. 22, 2015

(54) CAPTURING AND RESTORING AN APPLIANCE IMAGE

(75) Inventors: Terrence Ladd Yoder, Granite Bay, CA (US); Dante Vitale, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 12/363,415

(22) Filed: Jan. 30, 2009

(51) Int. Cl.
*G06F 15/177* (2006.01)
*G06F 15/16* (2006.01)
*G06F 9/455* (2006.01)
*G06F 11/14* (2006.01)

(52) U.S. Cl.
CPC ........ *G06F 9/45558* (2013.01); *G06F 11/1469* (2013.01)

(58) Field of Classification Search
CPC ................. G06F 9/45558; G06F 2009/45562; G06F 11/1469
USPC .................................. 709/217, 219, 220, 222
See application file for complete search history.

(56) References Cited

U.S. PATENT DOCUMENTS

| | | | |
|---|---|---|---|
| 7,024,581 B1* | 4/2006 | Wang et al. | 714/2 |
| 2005/0289533 A1* | 12/2005 | Wang et al. | 717/168 |
| 2010/0005531 A1* | 1/2010 | Largman et al. | 726/24 |

* cited by examiner

*Primary Examiner* — Hieu Hoang
(74) *Attorney, Agent, or Firm* — Wagner Biecher LLP

(57) ABSTRACT

A method of capturing and restoring an appliance image is described. An appliance image comprising one or more partitions of an appliance is accessed, wherein the appliance is installed at a first location on a first blade. Re-imaging instructions associated with the one or more partitions are received. The re-imaging instructions and a data store comprising a plurality of partition capture tools are compared. Based on the comparing, a captured appliance image is generated by utilizing one or more of the plurality of partition capture tools. Restore instructions to restore a captured appliance image onto a second blade are then received. Captured metadata is then accessed, wherein the captured metadata comprises the captured appliance image and the re-imaging instructions associated with the one or more partitions. Then, the re-imaging instructions are utilized to restore the captured appliance image onto the second blade.

17 Claims, 12 Drawing Sheets

1200

Start

Receive instructions to restore a captured appliance image onto a blade, wherein the captured appliance image comprises one or more partitions.
1205

Access captured metadata comprising the captured appliance image and re-imaging instructions associated with the one or more partitions.
1210

Utilize the re-imaging instructions to restore the captured appliance image onto the blade.
1215

End

FIG. 12

CAPTURING AND RESTORING AN APPLIANCE IMAGE

FIELD

The field of the present invention relates to computing systems. More particularly, embodiments of the present invention relate to server blades.

BACKGROUND

Blade servers are widely used in datacenters to save space and improve system management. They are self-contained computer servers, designed for high density. Blade servers have many components removed for space, power and other considerations while still having all the functional components to be considered a computer.

One of the principal benefits of blade computing is that components are no longer restricted to the minimum size requirements of the standard server-rack configuration. For example, densities of a hundred computers per rack and more are achievable with the present blade systems. Furthermore, as more processing power, memory and I/O bandwidth are added to blade servers, they are being used for larger and more diverse workloads. Additionally, each blade of a blade server has its own software appliance coupled therewith, thereby allowing for hundreds of software appliances to comprise one blade server.

However, there exist many limitations to the current state of technology with respect to blade servers. For example, while a blade server may host hundreds of software appliances coupled with hundreds of blades therein, the overwhelmingly large amount of blade inventory associated with these software appliances is costly to manage.

BRIEF DESCRIPTION OF THE DRAWINGS

The accompanying drawings, which are incorporated in and form a part of this specification, illustrate embodiments of the present technology for a system for managing appliance licensing and, together with the description, serve to explain principles discussed below:

FIG. 12 is a flowchart of an example method for restoring an appliance image, in accordance with embodiments of the present technology.

Figure 1:
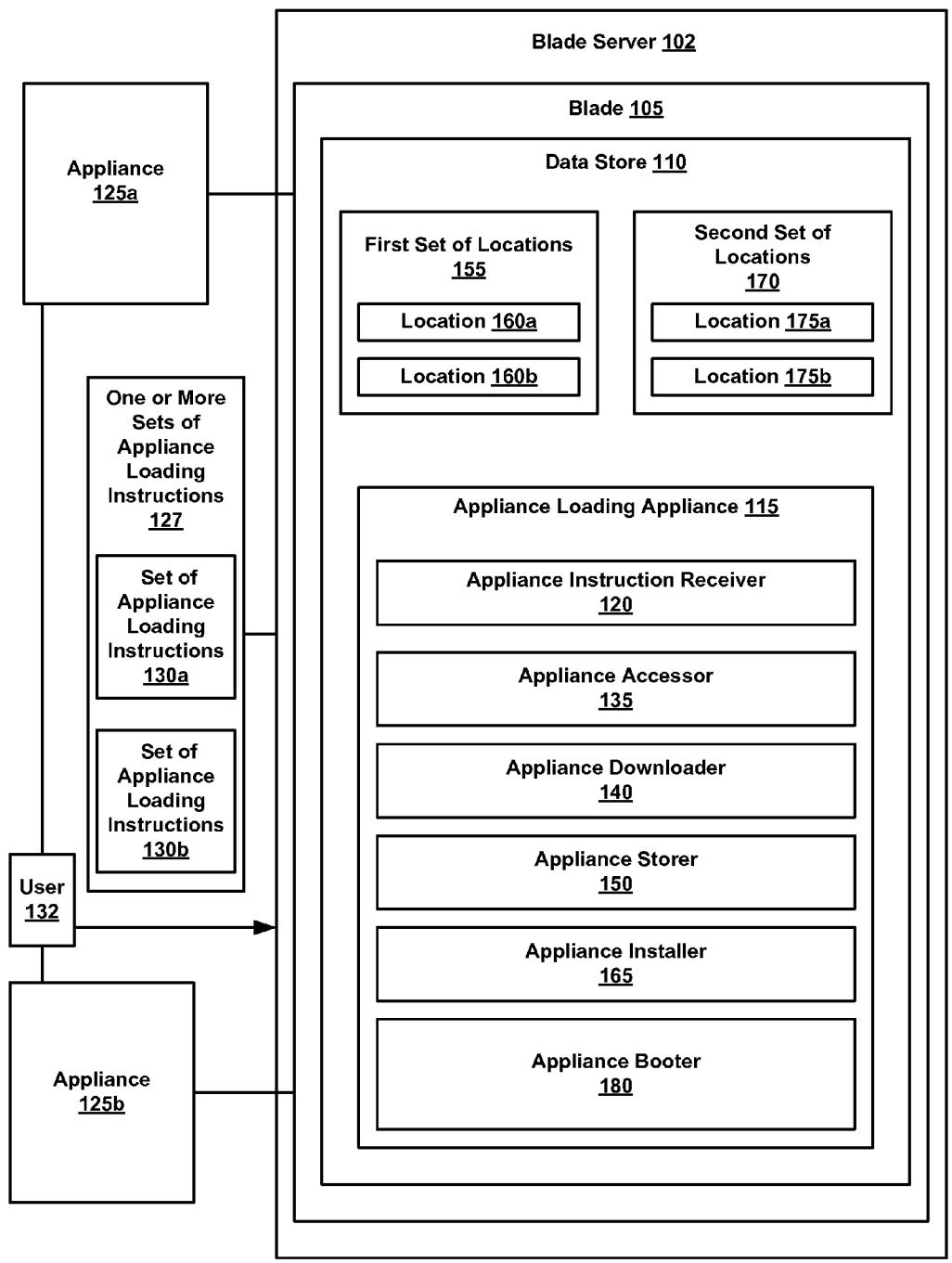
FIG. 1 is a block diagram of an example system for enabling a plurality of appliances to be dynamically loaded onto a blade, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "downloading", "storing", "installing", "booting", "discontinuing", "re-booting", "uninstalling", "performing", "utilizing", "accessing", "comparing", "generating", "allowing", "decoding", "identifying", "applying", "updating", "receiving", "compressing", "analyzing", "restoring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Example Appliance Loading Appliance-Overview

Embodiments in accordance with the present technology pertain to a system for enabling a plurality of appliances to be dynamically loaded onto a blade. In one embodiment, the blade has an appliance loading appliance coupled therewith. The appliance loading appliance is a software application. This appliance loading appliance enables a plurality of software applications to be serially run on the blade.

This method of enabling a plurality of appliances to be dynamically loaded onto a blade decreases the current inventory management costs associated with blades. For example, each server may hold hundreds of blades. Each of these blades is dedicated to a specific and different appliance. These dedicated blades are warehoused until they are needed. Many resources, such as time, money, personnel, and real estate, are used to manage this blade inventory. Moreover, when the appliance on a dedicated blade is no longer wanted or needed, the dedicated blade is thrown out. Thus, having a single blade dedicated to a single appliance creates much waste.

However, embodiments of the present technology enable one blade to be dedicated to a plurality of different appliances. Furthermore, in one embodiment, a blade's function may be changed, or "re-purposed", by running a new appliance with a new capability on the blade, thereby replacing the original appliance. Thus, inventory management costs and waste are decreased by enabling the re-use of blades via enabling multiple appliances to serially run on a single blade.

More particularly, in one embodiment, the appliance loading appliance functions to receive instructions from a user to download, store, install, and serially run one or more appliances. The appliance loading appliance downloads the appliances and then stores them on the blade's hard disk drive. Next, the appliance loading appliance installs one of the downloaded appliances on a different part of the blade's hard disk drive. This installed appliance is then booted and run on the blade. By having its own operating system that is dedicated to loading other appliances on the blade, the appliance loading appliance enables a plurality of appliances having different capabilities and their own operating systems to serially run on a blade.

Example Architecture of Appliance Loading Appliance

FIG. 1 is a block diagram of an example appliance loading appliance (ALA) 115, in accordance with embodiments of the present technology. ALA includes appliance instruction receiver 120, appliance accessor 135, appliance downloader 140, appliance storer 150, appliance installer 165, and appliance booter 180.

Referring still to FIG. 1, in one embodiment ALA 115 is coupled with data store 110. Data store 110 is coupled with blade 105 on server 102. Data store 110 comprises the description herein of RAM 408 and/or data storage unit 412 of FIG. 4. In one embodiment, ALA 115 comprises an operating system.

In one embodiment, ALA 115 receives one or more sets of appliance loading instructions 127 from user 132. User 132 has access to the appliances, such as but not limited to appliances 125a and 125b shown in FIG. 1. The appliance loading instructions may be received via wire or wirelessly. For example, appliance loading instructions may be received via the Internet. While only appliances 125a and 125b are depicted in FIG. 1, it is understood that appliances 125a and 125b may represent any number of appliances. For purposes of brevity and clarity, when one or more appliances 125a and 125b are referenced, it is meant to refer to any number of appliances, unless noted otherwise.

Appliance loading instructions comprise instructions as to what appliances are to be downloaded, stored, installed, and eventually booted onto blade 105. While only two of the one or more sets of appliance loading instructions 127 are depicted in FIG. 1, such as set of appliance loading instructions 130a and 130b, it is understood that set of appliance loading instructions 130a and 130b may represent any number of sets of appliance loading instructions. For purposes of brevity and clarity, when set of appliance loading instructions 130a and 130b is referenced, it is meant to refer to any number of sets of appliance loading instructions, unless noted otherwise.

In one embodiment, appliances 125a and 125b are software applications and operating systems in which they run. Each appliance has a capability. A capability refers to a function of a software application, such as but not limited to, scanning for viruses, providing a variety of interfaces, recording a television show, etc.

As shown in FIG. 1, data store 110 includes a first set of locations 155 comprising locations 160a and 160b, and second location 170. Each location 160a, 160b, and 170 represents a separate space on data store 110. While only locations 160a and 160b of first set of locations 155 are depicted in FIG. 1, it is understood that there may be any number of locations within first set of locations 155. For purposes of brevity and clarity, when locations 160a and 160b are referenced, it is meant to refer to any number of locations, unless noted otherwise herein.

Figure 2:
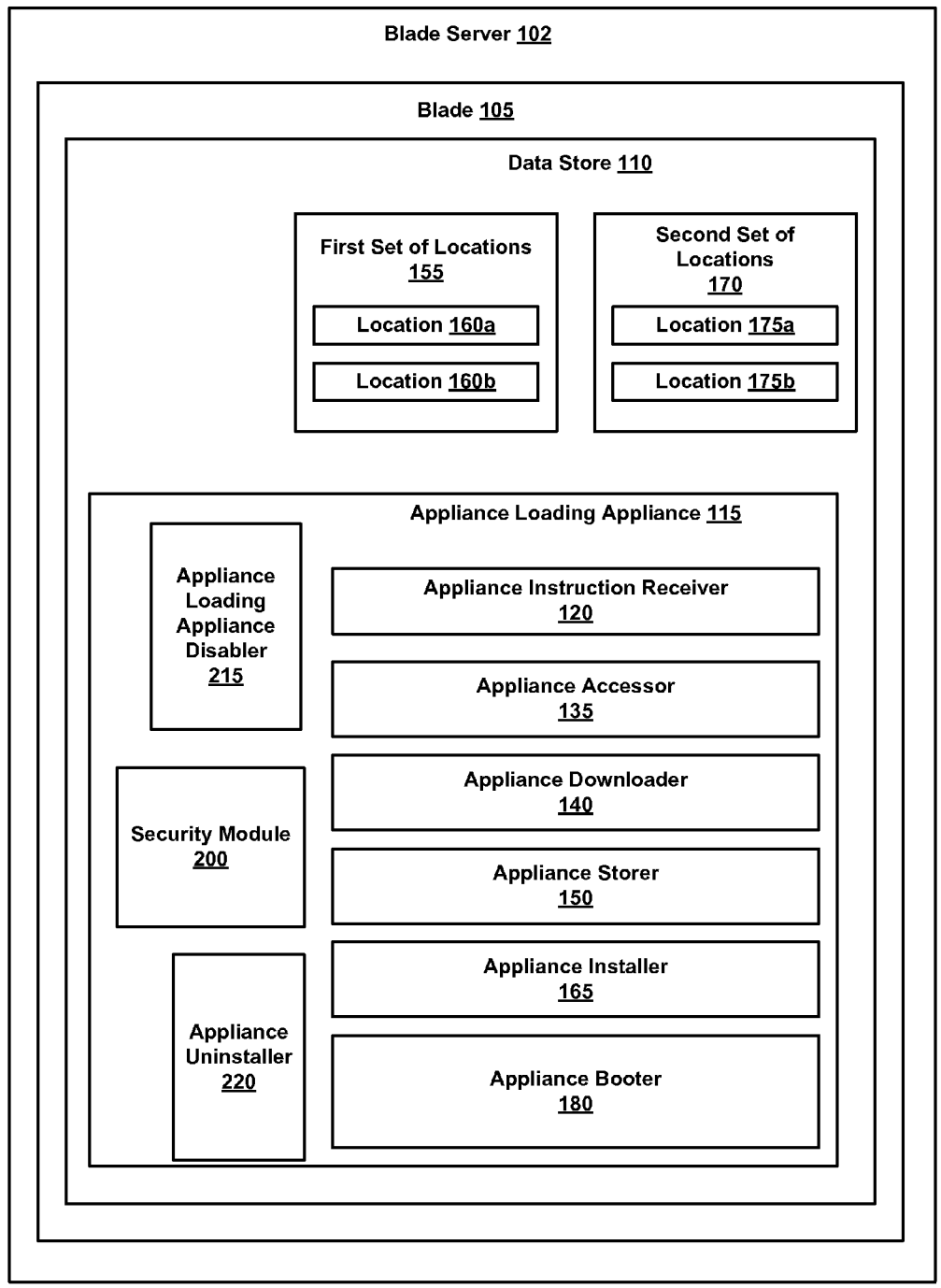
FIG. 2 is a block diagram of an example system for enabling a plurality of appliances to be dynamically loaded onto a blade, in accordance with embodiments of the present technology.

FIG. 2 is a block diagram of an example appliance loading appliance (ALA) 115, in accordance with embodiments of the present technology. In one embodiment, ALA 115 may further include security module 200, ALA disabler 215, and/or appliance uninstaller 220.

Example Operation of an Appliance Loading Appliance

More generally, in embodiments in accordance with the present technology, ALA 115 is utilized to dynamically load a plurality of appliances onto a blade, thereby enabling a blade to serially run multiple appliances with different capabilities. This is advantageous because it allows customers to buy and load appliances with different features "off the shelf" without having to purchase a new blade.

Referring to FIG. 1, in one embodiment, appliance instruction receiver 120 receives one or more sets of appliance loading instructions 127 corresponding to one or more appliances, such as appliances 125a and 125b. For example, appliance instruction receiver 120 may receive one or more sets of appliance loading instructions 127 from user 132 that details the timing and content regarding the downloading of an appliance by ALA 115, the storing of the appliance on the blade, the installation of the appliance on the blade, and the booting of the appliance on the blade. Each set 130a and 130b of the one or more sets of appliance loading instructions 127 pertains to only one appliance. A set of appliance loading instructions itself may include one or more instructions.

Referring to FIG. 1, in one embodiment, appliance accessor 135 accesses one or more appliances, such as but not limited to appliances 125a and 125b. In another embodiment, appliance downloader 140 downloads one or more appliances, wherein each appliance of the one or more appliances has a capability different from each other. For example, appliance 125a may be a firewall software application, whereas appliance 125b may a software application for providing interface options.

Referring still to FIG. 1, in one embodiment, appliance storer 150 stores at first set of locations 155 on data store 110 the one or more appliances that were downloaded. For example, a set of appliance loading instructions 130a may direct appliance storer 150 to store appliance 125a at location 160a on data store 110. In another example, another set of appliance loading instructions 130b may direct appliance storer 150 to store appliance 125b at location 160b on data store 110. As stated herein, locations 160a and 160b each correspond to different appliances and occupy different spaces within data store 110.

Referring to FIG. 1, in one embodiment, appliance installer 165 installs at a second location 170 at data store 110 one of the appliances of the one or more appliances that were downloaded. For example, appliance 125a having been downloaded and stored at location 160a, may now be installed according to a set of appliance loading instructions 130a, at location 170. If appliance 125a is subsequently uninstalled, then appliance 125b having been downloaded and stored at location 160b, may be installed according to another set of appliance loading instructions 130b.

Referring to FIG. 1, in one embodiment, in response to instructions from a set of appliance loading instructions, appliance booter 180 boots onto blade 105 one of the appliances that is installed. For example, appliance booter 180 boots onto blade 105 appliance 125a that is installed at location 170.

Referring now to FIG. 2, in one embodiment, security module 200 performs a security check before the downloading of an appliance occurs. In one embodiment, a security check includes checking a signature of an appliance. Utilizing standard technology known in the art, various methods may be performed to authenticate the signature of the appliance and/or the identification of the user attempting to download the appliance to a blade. Additionally, before an appliance can be run, it must be determined if the appliance is licensed and activated. This is done using standard techniques known in the art.

Referring to FIG. 2, in one embodiment ALA disabler 215 discontinues a run-time of ALA 115 after the booting of an appliance. For example, once ALA 115 boots appliance 125a, ALA disabler 215 acts to disable ALA 115 such that ALA 115 is no longer running. In other words, ALA 115, along with its operating system, is lying dormant.

However, in one embodiment, an appliance that is running on the blade to which ALA 115 is coupled, gives re-booting instructions to ALA 115, such that ALA 115 is allowed to re-boot and run once again. For example, an appliance such as 125a is able to give re-booting instructions because a piece of software was placed within appliance 125a that allows it to give re-booting instructions to ALA 115. Allowing re-booting of ALA 115 enables ALA 115 to download, store, install, and boot a new appliance, such as appliance 125b.

Referring to FIG. 2, in one embodiment, appliance uninstaller 220 uninstalls one or more appliances in response to receiving uninstall instructions. These uninstall instructions may originate from user 132. For example, appliance 125a may be running on blade 105. User 132 may give uninstall instructions to uninstall appliance 125a from blade 105. In response to these uninstall instructions, appliance uninstaller 220 uninstalls 125a from blade 105.

In another embodiment, once appliance 125a having a first capability is uninstalled, blade 105 may be re-purposed by installing and booting appliance 125b on blade 105. Appliance 125b has a capability different from appliance 125a's capability. A blade is re-purposed from its original state if it is enabled to perform a function different from its original function. In other words, adding a new capability to a blade results in a re-purposing of the blade.

Figure 3:
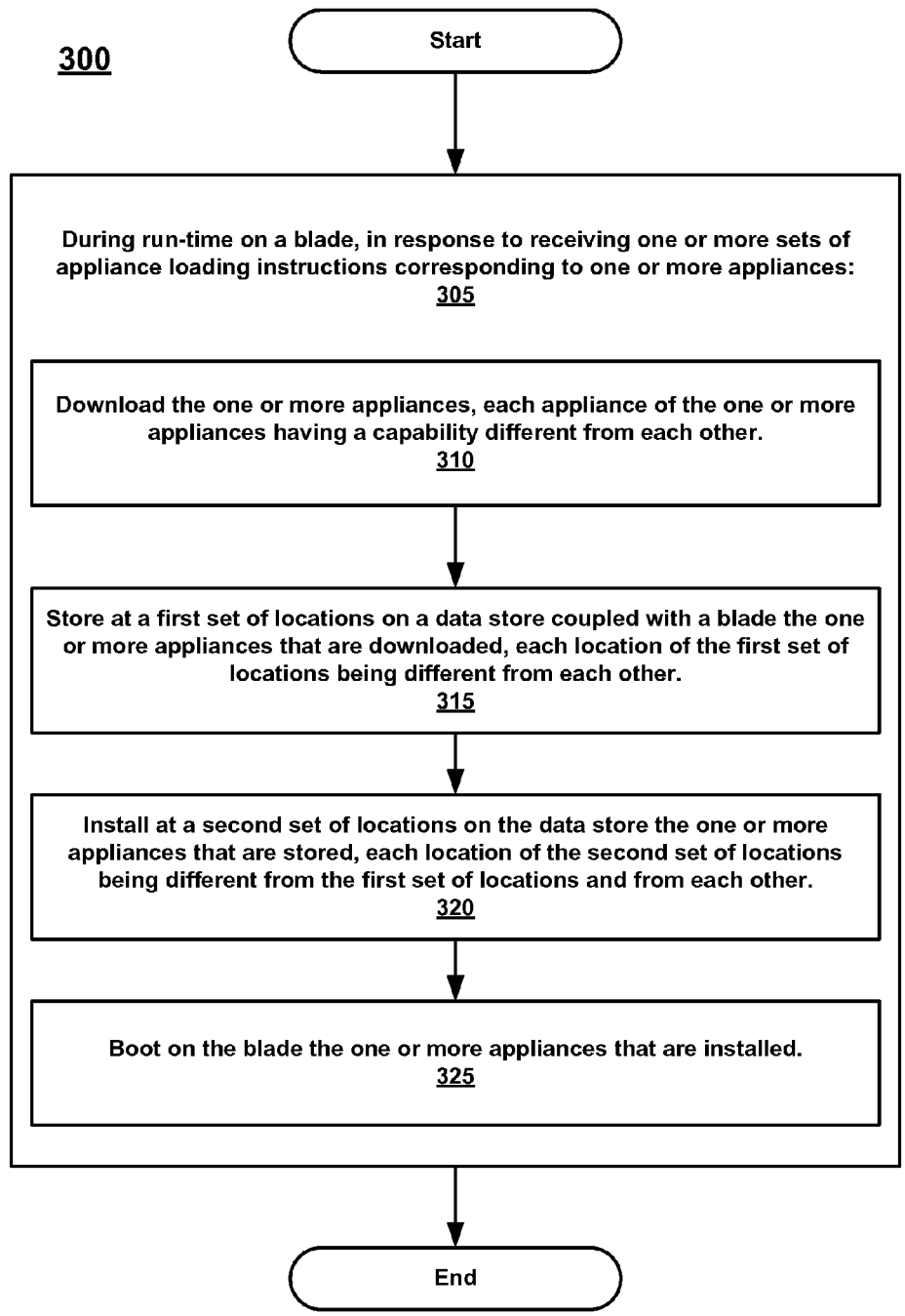
FIG. 3 is a flowchart of an example method for enabling a plurality of appliances to be dynamically loaded onto a blade, in accordance with embodiments of the present technology.

Referring now to 300 of FIG. 3, a flowchart of an example computer-implemented method for enabling a plurality of software appliances to be dynamically loaded onto a blade, in accordance with embodiments of the present technology is shown.

Referring to 305 of FIG. 3 and as described herein, in one embodiment of the present technology, during run-time on blade 105, in response to receiving one or more sets of appliance loading instructions 127 corresponding to one or more appliances 125a and 125b, one or more appliances 125a and 125b are downloaded. Each appliance of one or more appliances 125a and 125b has a capability different from each other.

Referring to 310 of FIG. 3 and as described herein, in one embodiment of the present technology, during run-time on blade 105, in response to receiving one or more sets of appliance loading instructions 127 corresponding to one or more appliances 125a and 125b, one or more appliances 125a and 125b are stored at first set of locations 155 on data store 110. Each location 160a and 160b is different from each other.

Referring to 315 of FIG. 3 and as described herein, in one embodiment of the present technology, during run-time on blade 105, in response to receiving one or more sets of appliance loading instructions 127 corresponding to one or more appliances 125a and 125b, one 125a of the one or more appliances 125a and 125b that are stored at first set of locations 155 is installed at second location 170 on data store 110. Location 170 is different from first set of locations 155.

Referring to 320 of FIG. 3 and as described herein, in one embodiment of the present technology, during run-time on blade 105, in response to receiving one or more sets of appliance loading instructions 127 corresponding to one or more appliances 125a and 125b, appliances 125a that is installed at second location 170 is booted on blade 105.

Example Computer System Environment

Figure 4:
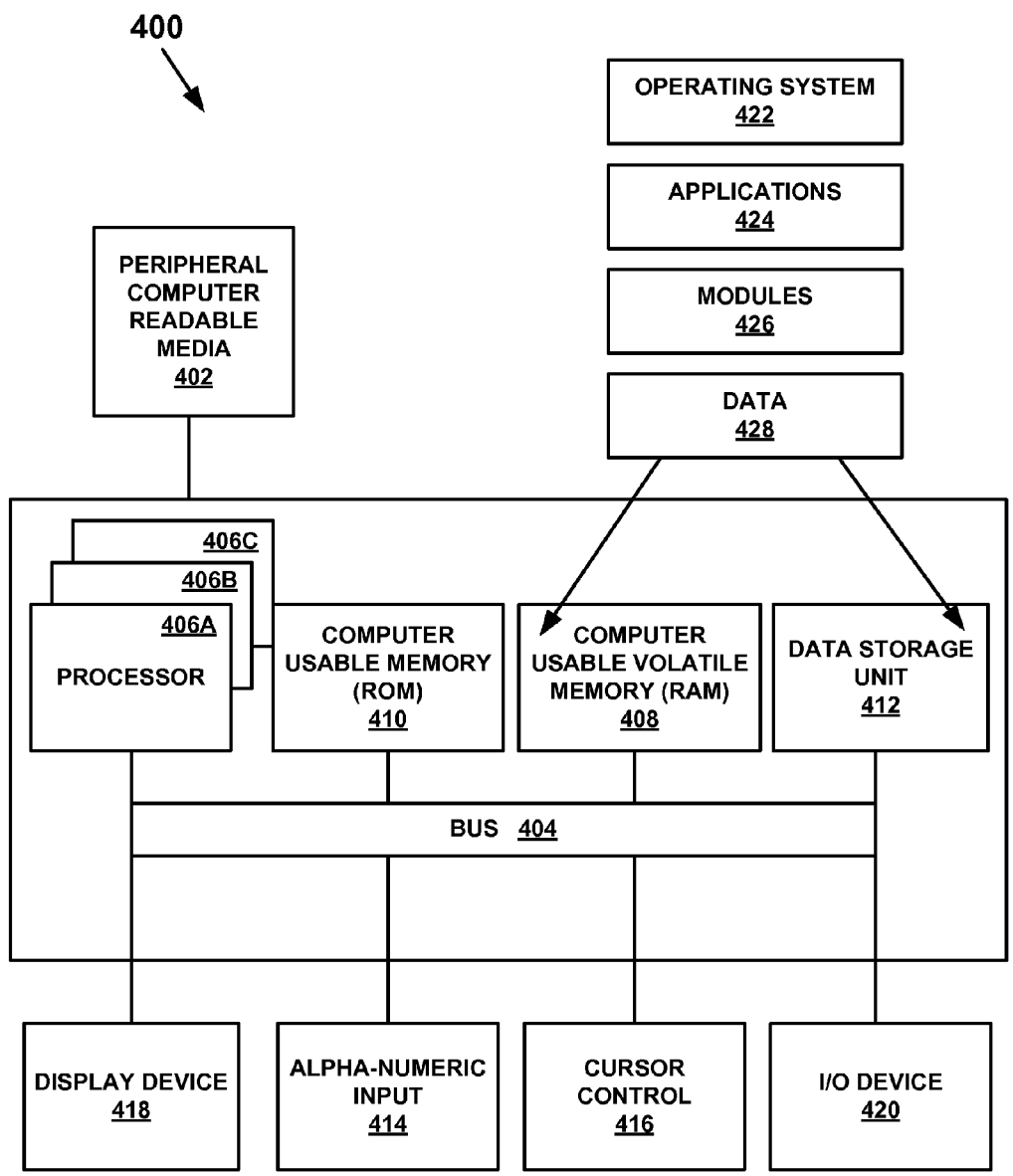
FIG. 4 is a diagram of an example computer system enabling a plurality of appliances to be dynamically loaded onto a blade, in accordance with embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors, but all would be of the same type of microprocessor. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of embodiments of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Figure 5:
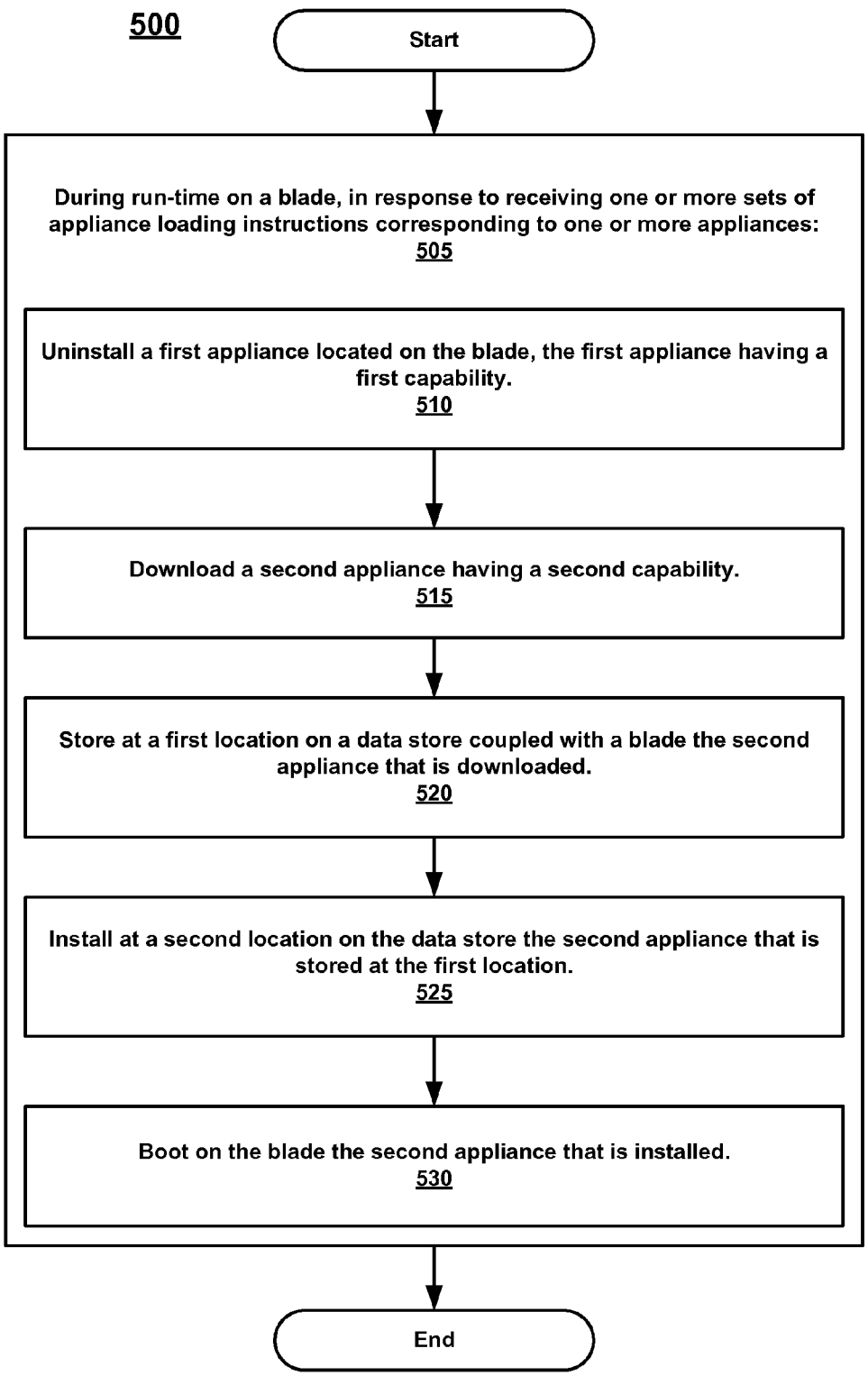
FIG. 5 is a flowchart of an example method for enabling a plurality of appliances to be dynamically loaded onto a blade, in accordance with embodiments of the present technology.

FIG. 5 is a flowchart of an example method for enabling a plurality of appliances to be dynamically loaded onto a blade, in accordance with embodiments of the present technology. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by ALA 115 of FIG. 1.

Referring to 505 and 510 of FIG. 5, in one embodiment and as described herein, during run-time on blade 105, in response to receiving one or more sets of appliance loading instructions 127 corresponding to one or more appliances 125a and 125b, a first appliance 125a on blade 105 is uninstalled, wherein first appliance 125a has a first capability.

Referring to 515 of FIG. 5, in one embodiment and as described herein, second appliance 125b having a second capability is downloaded. Referring to 520 of FIG. 5 and as described herein, second appliance 125b that is downloaded is then stored at first location 160a on data store 110 coupled with blade 105.

Referring to 525 of FIG. 5, in one embodiment and as described herein, second appliance that is stored at first location 160a is installed at second location 170 on data store 110. Referring to 530 of FIG. 5, in one embodiment and as described herein, second appliance 125b that is installed at second location 170 is booted on blade 105.

Thus, embodiments of the present technology enable the serial running of a plurality of appliances on a single blade, thereby reducing blade inventory and conserving resources. Additionally, due to the ability to re-purpose a blade, waste is reduced.

Example Appliance Licensing Manager-Overview

Figure 6:
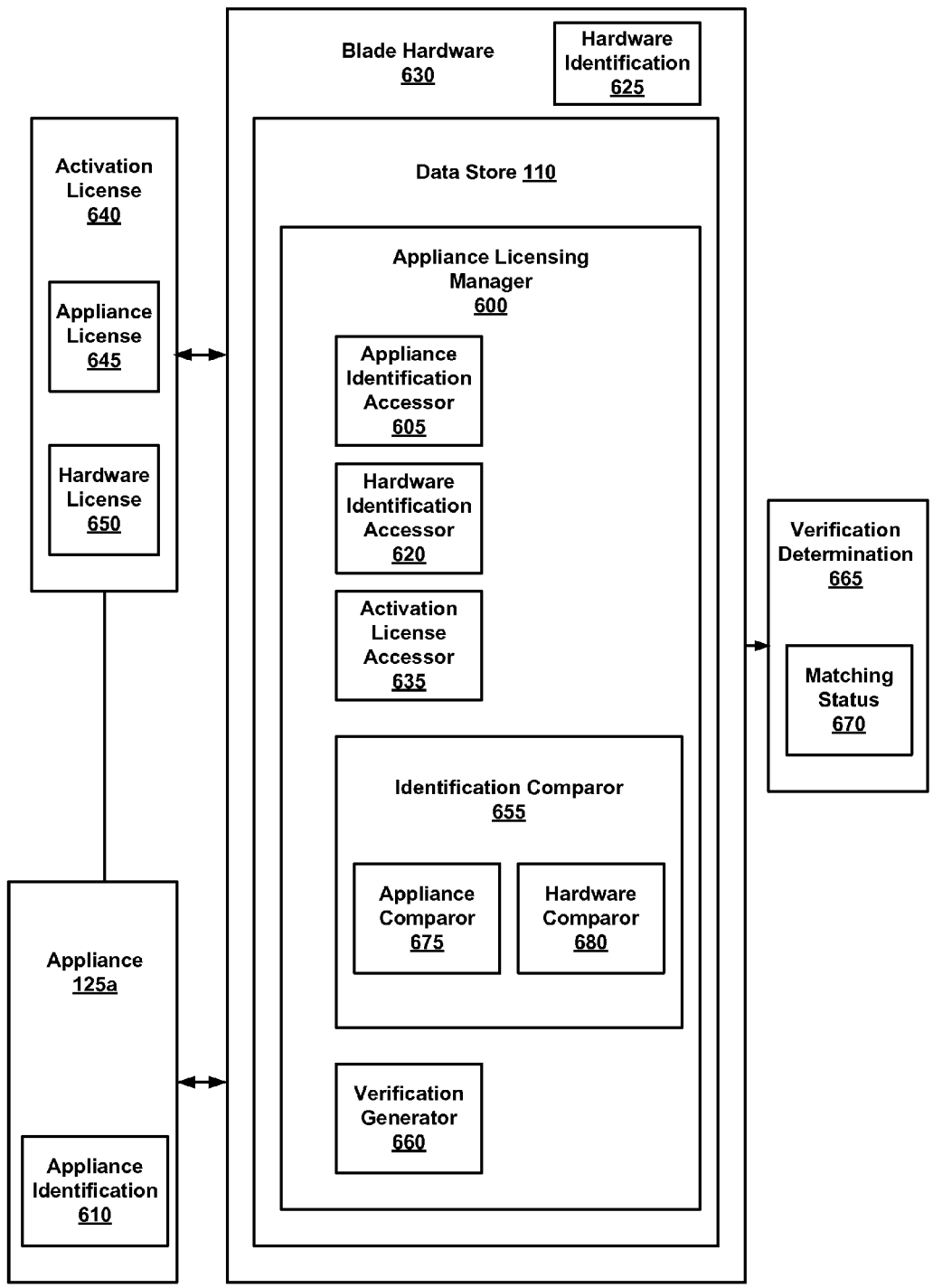
FIG. 6 is a block diagram of an example appliance licensing manager, in accordance with embodiments of the present technology.

With reference to FIG. 6, embodiments in accordance with the present invention pertain to an example appliance licensing manager (ALM) 600 for managing appliance licensing. In general, ALM 600 described herein enables the pre-installation and/or the pre-licensing of an appliance capability bundle to be performed in any order.

"Pre-installation" refers to an "install first, license second" approach to running an appliance capability bundle. For example, pre-installation allows for bulk installation of appliance capability bundles within a company. Since installation is one of the most time-consuming aspects of appliance set-up, the ability to pre-install appliances is valuable to a customer.

In contrast, "pre-licensing" refers to a "license first, install second" approach to running an appliance capability bundle. For example, pre-licensing allows for unrestricted demonstration use of an appliance capability bundle or a subset thereof. The ability to pre-install and to pre-license the same appliance capability bundle is valuable to a customer. Embodiments of the present technology enable an appliance capability bundle to be pre-installed or pre-licensed in any order, while still retaining its architecture.

More particularly, in one embodiment ALM 600 accesses an appliance identification from an appliance that is instructed by a user to be run on a blade. ALM 600 determines if the appliance has an activation license. If ALM 600 finds an activation license, ALM 600 decodes it. However, if ALM 600 finds that there is not an activation license, then the appliance is not allowed to run on the blade.

In one embodiment, once decoded, ALM 600 accesses the appliance license embedded within the decoded activation license. If the activation license has an appliance license that does not match the appliance identification obtained from the appliance, then the appliance is not allowed to run on the blade.

However, if the activation license has an appliance license that matches the appliance identification obtained from the appliance, then it is known that the activation license is for the same appliance that is to be run and is therefore appropriate.

Next, the activation license's hardware license status is investigated. In one embodiment, the hardware license that is embedded within the decoded activation license is then compared to the hardware identification from the blade hardware. If the hardware license and the hardware identification do not match, then the appliance is not allowed to run. In this instance where the hardware identification and the hardware license do not match, it may be found that a user is trying to run an appliance, for which there is an appliance license, on the wrong blade. However, in one embodiment, if the hardware license and the hardware identification match, then the appliance is allowed to run.

Thus, in embodiments of the present invention, ALM 600 utilizes appliance and hardware identifications found on the appliance, the blade hardware, and the activation license, to determine if the appliance is licensed to run on a specific blade. This determination may be performed before installation occurs, hence enabling pre-licensing of an appliance. On the other hand, this determination may be performed after installation occurs, hence enabling pre-installation of an appliance.

The following discussion will begin with a description of embodiments of the structure of components herein in accordance with the present technology. This discussion will then be followed by a description of embodiments of the operation and function of the components herein.

Example Architecture of Appliance Licensing Manager

FIG. 6 is a block diagram of an example appliance licensing manager (ALM) 600, in accordance with embodiments of the present technology. ALM 600 is coupled with data store 110. Data store 110 is coupled with blade hardware 630, which in turn is coupled with blade 105. Blade hardware 630 comprises hardware identification 625. ALM 600 includes appliance identification accessor 605, hardware identification accessor 620, activation license accessor 635, identification comparor 655, and verification generator 660. In further embodiments of the present technology, identification comparor 655 includes appliance comparor 675 and hardware comparor 680.

Referring still to FIG. 6, in one embodiment ALM 600 may access appliance 125*a*. Appliance 125*a* comprises appliance identification 610. ALM 600 may also access activation license 640. Activation license 640 is a license for a particular appliance or an appliance family, and gets registered to a specific piece of hardware for the appliance. Activation license 640 may be accessed at the appliance itself, at the manufacturer of the appliance, and/or at a third location via the Internet.

In one embodiment, activation license 640 includes appliance license 645 and hardware license 650. Activation license 640 is coded such that the embedded appliance license 645 and hardware license 650 may not be read by ALM 600 without decoding activation license 640. Both appliance license 645 and hardware license 650 comprise license IDs that may correspond to appliance identification 610 and hardware identification 625. In one embodiment, if the license IDs within appliance license 645 and hardware license 650 are the same as appliance identification 610 and hardware identification 625, then a match is determined. In one embodiment, an appliance license 645 may refer to one or more capabilities bundled within the appliance.

As will be described herein, embodiments of the present technology provide for a method of managing appliance licensing. By enabling the comparison between the appliance identification, the blade's hardware identification, and the corresponding license IDs within an activation license, an appliance may be licensed before being installed or after being installed.

Example Operation of Appliance Licensing Manager

More generally, in embodiments in accordance with the present technology, ALM 600 is utilized to support any number of different appliance capability bundles to be installed and run on a blade. Licensing may be performed before or after the installation of an appliance capability bundle. Thus, ALM 600 supports pre-licensing and/or pre-installing of an appliance software bundle to be done in any order.

Referring to FIG. 6, in one embodiment, appliance identification accessor 605 accesses an appliance identification 610 at appliance 615. In one embodiment, hardware identification accessor 620 accesses hardware identification 625 at blade hardware 630 with which ALM 600 is coupled. Next, in another embodiment, activation license accessor 635 accesses activation license 640. As described herein, activation license 640 comprises appliance license 645 corresponding to an appliance and hardware license 650 corresponding to blade hardware 630. For example, appliance license 645 corresponds to appliance 615, and hardware license 650 corresponds to blade hardware 630.

Furthermore, in one embodiment, activation license accessor 635 decodes activation license 640 and accesses appliance license 645 embedded within the decoded activation license.

Referring still to FIG. 6, in one embodiment, identification comparor 655 compares appliance identification 610, hardware identification 625, and activation license 640. For example, once activation license accessor 635 accesses appliance license 645 within the decoded activation license, then appliance comparor 675 compares appliance identification 610 with appliance license 645. The hardware comparor 680 accesses hardware license 650 that is embedded within the decoded activation license and compares hardware license 650 with hardware identification 625 to determine a matching status. More specifically, the identification embedded within appliance license 645 is compared to appliance identification 610. The identification embedded within hardware license 650 is compared with hardware identification 625.

Referring to FIG. 6, in one embodiment, verification generator 660 generates verification determination 665 comprising matching status 670 based on the comparing performed by identification comparor. Verification generator 660 generates matching status 670 before appliance 125*a* is booted on blade hardware 630. Matching status 670 comprises either a positive matching status or a negative matching status. If appliance license 645 and appliance identification 610 meet a pre-determined matching threshold, then a positive matching status is determined. If appliance license 645 and appliance identification 610 do not meet a pre-determined matching threshold, then a negative matching status is determined. In one embodiment, the matching threshold may be pre-determined by the manufacturer of the appliance or of the blade.

Likewise, if hardware identification 625 and hardware license 650 meet a pre-determined matching threshold, then a positive matching status is determined. If hardware identification 625 and hardware license 650 do not meet a pre-determined matching threshold, then a negative matching status is determined.

In one embodiment, if verification generator 660 generates matching status 670 that is positive, then ALM 600 allows the booting 325 of appliance 125*a* on blade 105. However, in another embodiment, if verification generator 660 generates matching status 670 that is negative, then ALM 600 does not allow the booting 325 of appliance 125*a* on blade 105.

In one embodiment, verification generator 660 generates matching status 670 after the installing 320 of appliance 125*a*. In another embodiment, verification generator 660 generates matching status 670 before the installing 320 of appliance 125*a*.

Figure 7:
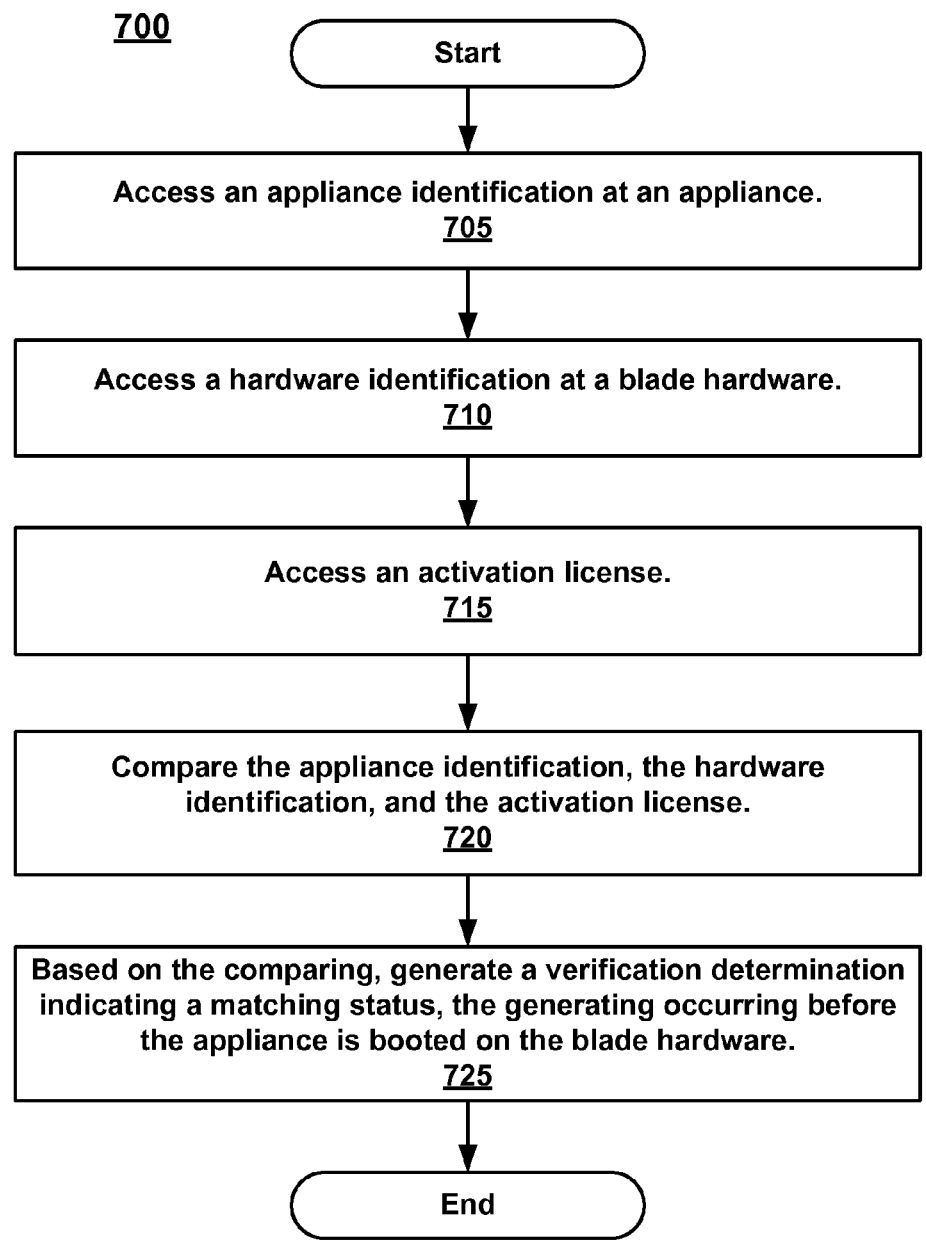
FIG. 7 is a flowchart of an example method for managing appliance licensing, in accordance with embodiments of the present technology.

Referring now to 700 of FIG. 7, a flowchart of an example computer-implemented method for managing appliance licensing, in accordance with embodiments of the present technology is shown.

Referring to 705 of FIG. 7 and as described herein, in one embodiment of the present technology, appliance identification 610 is accessed at appliance 125*a*. Referring to 710 of FIG. 7 and as described herein, in one embodiment hardware identification 625 is accessed at blade hardware 630. Referring now to 715 of FIG. 7 and as described herein, in one embodiment activation license 640 is accessed.

Referring to 720 of FIG. 7 and as described herein, in one embodiment, appliance identification 610, hardware identification 625, and activation license 640 is compared. Referring now to 725 of FIG. 7 and as described herein, in one embodiment, based on the comparing of 720 of FIG. 7, verification determination 665 indicating matching status 670 is generated, wherein matching status 670 is generated before appliance 125*a* is booted on blade hardware 630 of blade 105.

Figure 8:
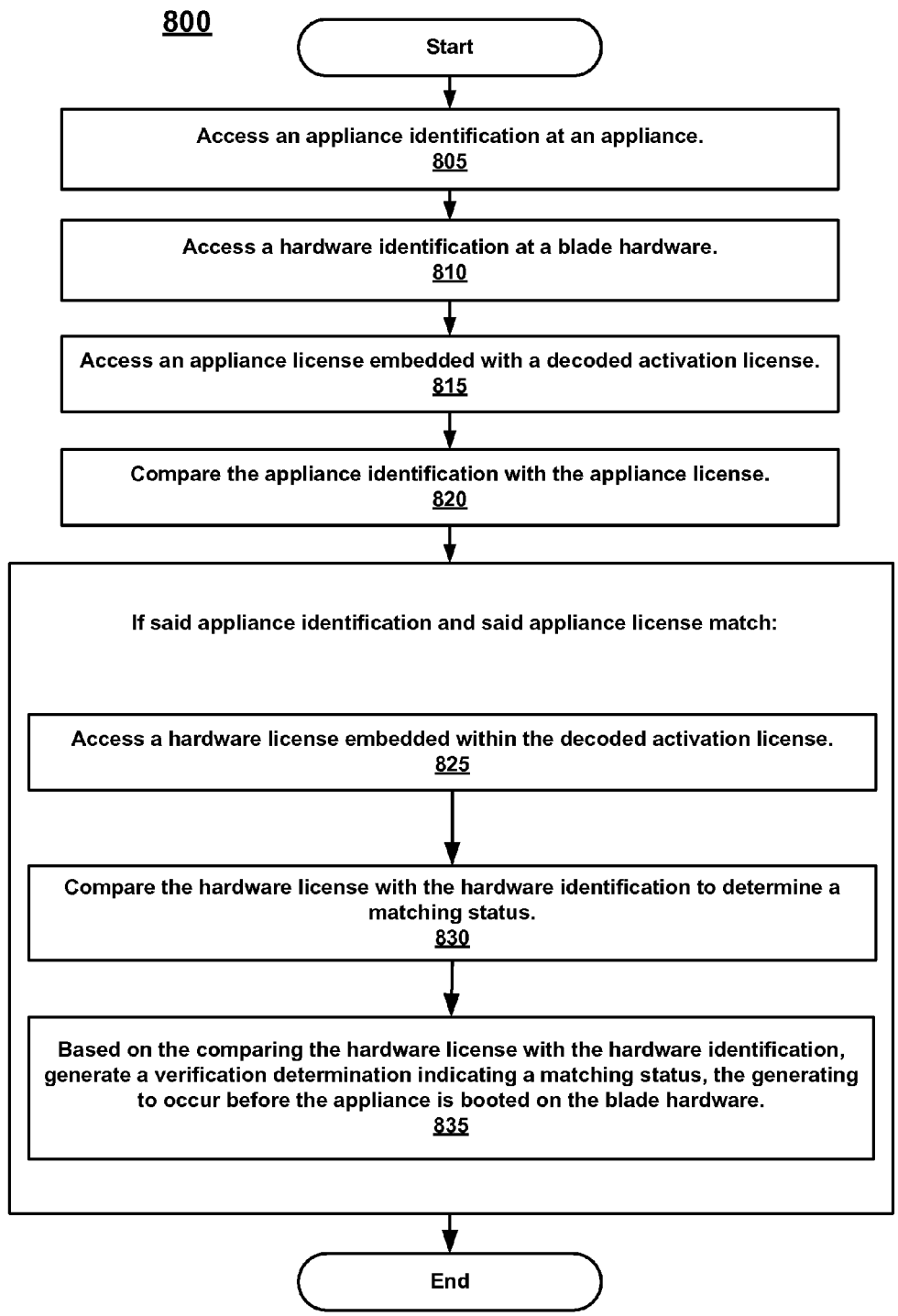
FIG. 8 is a flowchart of an example method for managing appliance licensing, in accordance with embodiments of the present technology.

FIG. 8 is a flowchart of an example method for managing appliance licensing, in accordance with embodiments of the present technology. In one embodiment, process 800 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 800 is performed by ALM 600 of FIG. 6.

Referring to 805 of FIG. 8, in one embodiment and as described herein, appliance identification 610 is accessed at appliance 125*a*. Referring to 810 of FIG. 8 and as described herein, in one embodiment hardware identification 625 is accessed at blade hardware 630. Referring to 815 of FIG. 8 and as described herein, in one embodiment appliance license 645 embedded within activation license 640 that is decoded is accessed. Referring to 820 of FIG. 8 and as described herein, in one embodiment appliance identification 610 and appliance license 645 are compared.

Referring to 825 of FIG. 8 and as described herein, in one embodiment if appliance identification 610 and appliance license 640 match, then hardware license 650 embedded within activation license 640 that is decoded is accessed. Referring to 830 of FIG. 8 and as described herein, in one embodiment hardware license 650 and hardware identification 625 are compared to determine matching status 670. Referring to 835 of FIG. 8 and as described herein, in one embodiment based on the comparing of 830 of FIG. 8, verification determination 665 indicating matching status 670 is generated, wherein the generating occurs before appliance 125*a* is booted on blade hardware 630 of blade 105.

Thus, embodiments of the present technology enable an appliance to be licensed before it is installed on a blade. Additionally, according to embodiments of the present technology, an appliance may also be installed on a blade before it is licensed and thus activated. Therefore, embodiments of the present technology provide a customer with the flexibility to pre-license or pre-install the same appliance.

Example Appliance Re-Imager-Overview

Figure 9:
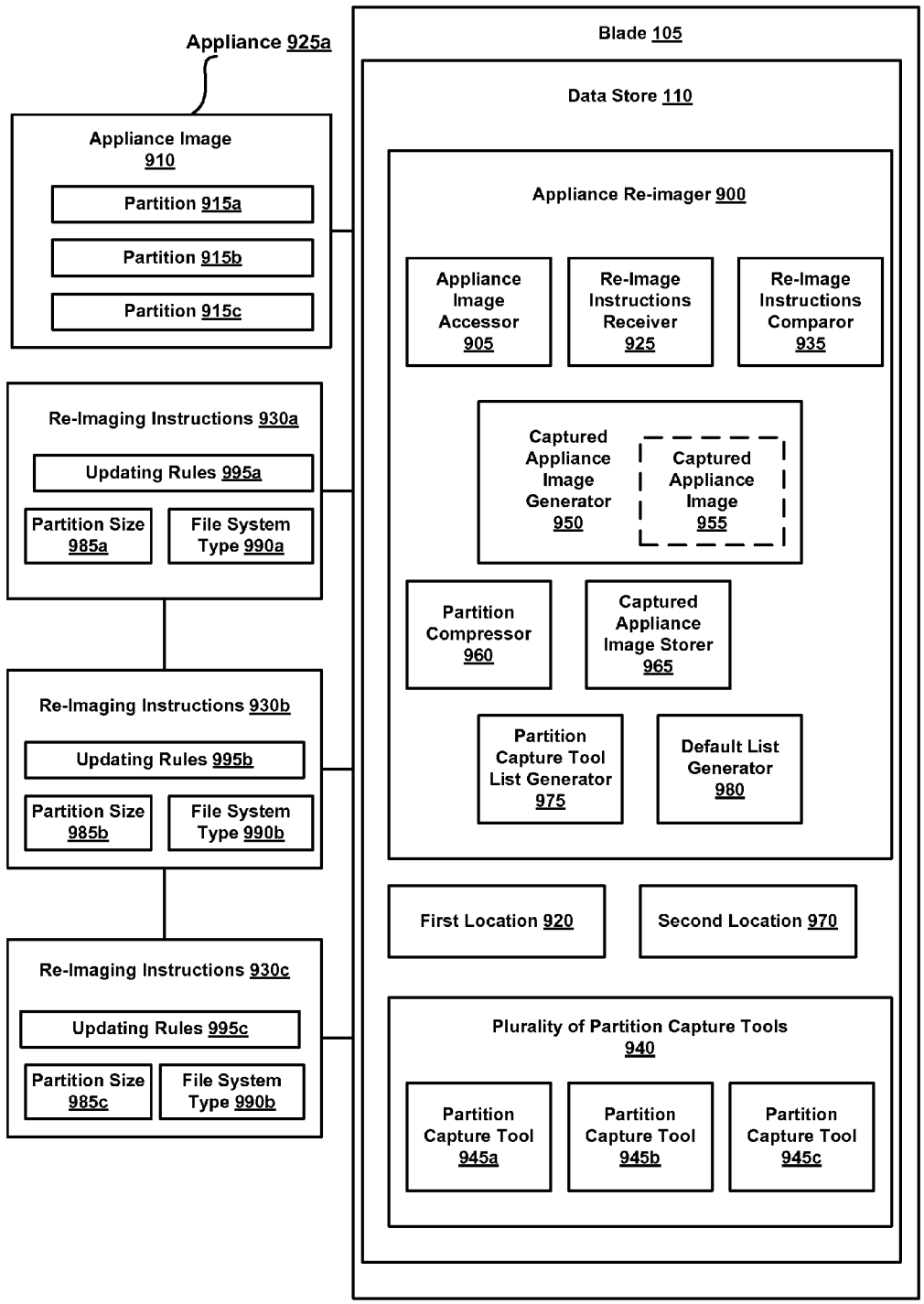
FIG. 9 is a block diagram of an example appliance re-imager, in accordance with embodiments of the present technology.

With reference to FIG. 9, embodiments in accordance with the present technology pertain to an example appliance re-imager (ARI) 900 for capturing and restoring an appliance image onto a blade.

More particularly, in one embodiment ARI 900 dynamically captures and restores one or more appliance partitions onto a customer's blade utilizing the appropriate partition capture tools available. The decision to use a particular partition capture tool to capture and restore a partition is based upon a comparison of re-imaging instructions and the partition capture tools available for use. In one embodiment, re-imaging instructions comprise the appliance developer's input and an analysis of each partition.

For example, an appliance developer "D" wishes to develop appliance "A" for resale by retailer "X". Appliance developer "D" uses a software development kit version of ALA 115 to install a newly developed appliance "A" onto "X"' blade. Using ARI 900 coupled with ALA 115, appliance developer "D" adjusts appliance "A" until satisfied that appliance "A" is properly installed.

After appliance developer "D"'s appliance "A" is installed, ARI 900 is used to "capture" appliance "A". For example, ARI 900 will access appliance "A". ARI 900 will receive re-imaging instructions from appliance developer "D" in response to a series of guided re-imaging questions being posed. Guided by the re-imaging instructions, and based the content of appliance "A", ARI 900 uses an appropriate partition capture tool to capture the data associated with appliance "A" and store this captured data at retailer "X". This stored information is the "captured appliance image" that will eventually be used by ARI 900 to restore the appliance image of appliance "A" onto a customer's blade.

For example, customer "B" purchases appliance "A" from retailer "X". Customer "B" downloads appliance "A" from retailer "X"'s website. ALI 900 now functions to restore appliance "A" onto customer "B"'s blade. In one embodiment, ARI 900 accesses the captured metadata associated with appliance "A". This captured metadata comprises the captured appliance image and the re-imaging instructions. ARI 900 utilizes these re-imaging instructions to restore the captured appliance image onto Customer "B"'s blade.

Thus, in embodiments of the present invention, ARI 600 utilizes captured metadata and a data store of available partition capture tools to efficiently capture and restore an appliance image onto a blade.

The following discussion will begin with a description of embodiments of the structure of components herein in accordance with the present technology. This discussion will then be followed by a description of embodiments of the operation and function of the components herein.

Architecture of Example Appliance Re-Imager

FIG. 9 is a block diagram of an example appliance re-imager (ARI) 900, in accordance with embodiments of the present technology. ARI 900 is coupled with data store 110. Data store 110 is coupled with blade 105. ARI 900 includes appliance image accessor 905, re-image instruction receiver 925, re-image instruction comparor 935, and captured appliance image generator 950. In one embodiment, ARI 900 further includes partition compressor 960, capture appliance image storer 965, appliance tool list generator 975, and default list generator 980.

Figure 10:
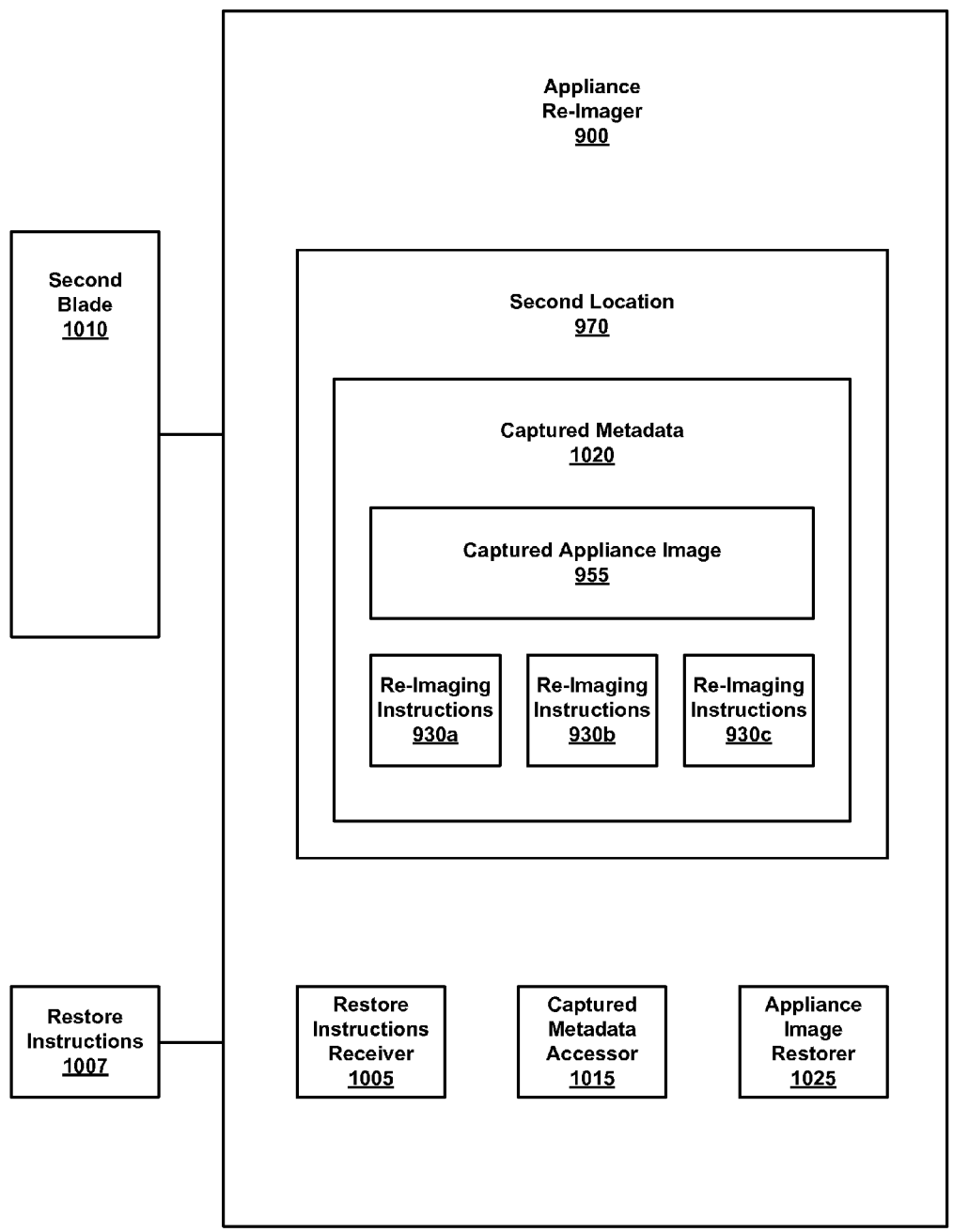
FIG. 10 is a block diagram of an example appliance re-imager, in accordance with embodiments of the present technology.

Referring briefly to FIG. 10, in one embodiment, appliance re-imager 900 further includes restore instructions receiver 1005, captured metadata accessor 1015, and appliance image restorer 1025.

Referring to FIG. 9, plurality of partition capture tools 940 is shown to be coupled with data store 110. In one embodiment, plurality of partition capture tools 940 is internal to data store 110 and consequently blade 105. In another embodiment, plurality of partition capture tools 940 may be coupled wire or wirelessly with blade 105 but reside external to blade 105. Plurality of partition capture tools 940 comprises 945*a*, 945*b*, and 945*c*. While only tools 945*a*, 945*b*, and 945*c* are depicted in FIG. 9, it is understood that 945*a*, 945*b*, and 945*c* may represent any number of tools. For purposes of brevity and clarity, when tools 945a, 945b, and 945c are referenced, it is meant to refer to any number of appliances, unless noted otherwise.

In one embodiment, each tool of plurality of partition capture tools 940 is software and is configured to capture and restore data. For example, one tool may be configured to re-image every bit and byte of an appliance partition. Another tool may be configured to re-image files or directories of an appliance partition. These partition capture tools are common in the computer industry, and may be used with appliance re-imager 900.

Referring still to FIG. 9, blade 105 is coupled with appliance 125a either wired or wirelessly. In one embodiment, appliance 125a, comprising appliance image 910, includes partitions 915a, 915b, and 915c.

Referring still to FIG. 9, in one embodiment, and representative all re-imaging instructions, re-imaging instructions 930a include partition size 985a, file system type 990a, and updating rules 995a. An updating rule may be, but is not limited to, an instruction to leave a certain partition alone, completely replace one or more partitions, and/or modify one or more partitions.

In another embodiment, a re-imaging instruction may be based on a partition's size. For example, a partition that has a larger size may require a partition capture tool that can re-image larger amounts of data. In one embodiment, a re-imaging instruction may be based on a file system type. A file system type may indicate the quantity of data within the file. For example, a swap file may comprise a very large partition but is essentially hollow inside. Even though the file appears to be large, an partition capture tool that is geared towards re-imaging small amounts of data may be selected to re-image the swap file.

In another embodiment, re-imaging instructions 930a, 930b, and 930c are derived from answers to a series of guided questions posed by ARI 900 to user 132. User 132 answers these questions, and the answers become part of the re-imaging instructions 930a, 930b, and 930c that are used to determine the appropriate partition capture tool for capturing and restoring appliance image 910. The term "appropriate" partition capture tool refers to the partition capture tool that is desired to be applied to particular data. This desire can be based on, but is not limited to, an efficiency model, a predefined list of partition capture tools to be used, and/or a user's decision to use one partition capture tool in place of another partition capture tool.

As will be described herein, embodiments of the present technology provide for a method of capturing and restoring an appliance image. While various partition capture tools are available for capturing and restoring, embodiments of the present technology enable the selection of the appropriate partition capture tool or tools to be applied to the one or more partitions to be captured and restored.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Example Operation of Appliance Re-Imager

More generally, in embodiments in accordance with the present technology, ARI 900 is utilized to dynamically re-image an appliance image by applying the appropriate partition capture tools available to each partition as needed. This re-imaging method saves time and resources by creating a more efficient method of restoring bits onto a blade.

Referring to FIG. 9, in one embodiment, appliance image accessor 905 accesses an appliance image comprising one or more partitions of an appliance that is installed at a first location on a first blade. For example, appliance image accessor 905 accesses appliance image 910 comprising one or more partitions 915a, 915b, and 915c, of appliance 125a that is installed at first location 920 on blade 105.

Referring to FIG. 9, in one embodiment, re-image instructions receiver 925 receives re-imaging instructions associated with the one or more partitions. For example, re-image instructions receiver 925 receives re-imaging instructions 930a associated with partitions 915. In another embodiment, re-image instructions receiver 925 receives re-imaging instructions 930b associated with partition 915b. In yet another embodiment, re-image instructions receiver 925 receives re-imaging instructions 930c associated with partition 915c. Re-image instructions may be received from user 132 and/or from a computer software program coupled with blade 105.

In one embodiment, re-imaging instructions comprise updating rules for an appliance. For example, re-imaging instructions 930a may contain updating rules 995a for appliance 125a. The updating rules 995a, in one embodiment may provide instructions that a partition from an appliance that was previously captured and stored, as will be discussed herein, be completely replaced by partition 915a or a portion thereof. For example, the data on an appliance partition that had already be capture and stored may be uninstalled, and a new set of bits from a designated file of a partition of appliance image 910 may be installed.

In yet another embodiment, updating rules 975a may provide instructions that a partition from an appliance that was previously captured and stored, as will be discussed herein, be left alone. Furthermore, updating rules may give instructions that user 132 is to have input as to the appropriate partition capture tool to use while updating a partition.

Additionally, updating rules may be determined at the time of capturing the appliance image. The developer of the appliance may specify in the update rules within the re-imaging instructions that certain components of the appliance are to be left alone during an updating.

Referring still to FIG. 9, in one embodiment and as described herein, re-imaging instructions 930a includes instructions regarding partition size 985a associated with partition 915a. In another embodiment and as describe herein, re-imaging instructions 930a includes instructions regarding file system type 990a associated with partition 915a.

Referring to FIG. 9, in one embodiment, re-image instructions comparor 935 compares the re-imaging instructions and a data store comprising a plurality of partition capture tools. For example, re-image instructions comparor 935 compares re-imaging instructions 930a and data store 110 comprising plurality of partition capture tools 940. Each partition capture tool 945a, 945b, and 945c is configured for generating a captured appliance image, as will be described herein.

Referring to FIG. 9, in one embodiment partition capture tool list generator 975 generates a list of selectable appropriate partition capture tools to apply to each of the one or more partitions 915a, 915b, and 915c. The list of selectable appropriate partition capture tools to apply is generated based on the comparing of the re-imaging instructions 930a, 930b, and 930c and the plurality of partition capture tools 940. For example, re-imaging instructions 930a may specify that the partition size 985a may benefit by the application of any of the following three partition capture tools, "B", "C", and "D". Partition capture tool list generator 975 then presents to user 132 a list of the following selectable choices, "B", "C", and "D". Thus, user 132 is presented with the opportunity to select the appropriate partition capture tool for the situation. Once selected, the partition capture tool is applied.

In one embodiment, default list generator 980 generates a list of default appropriate partition capture tools to apply to each of the one or more partitions 915a, 915b, and 915c. The list of default appropriate partition capture tools is generated based on the comparing of the re-imaging instructions 930a, 930b, and 930c and the plurality of partition capture tools 940. In one embodiment, the default list of the appropriate partition capture tools is pre-determined by the manufacturer and/or user 132.

Referring to FIG. 9, in one embodiment appliance captured appliance image generator 950 generates captured appliance image 955 by utilizing one or more of plurality of partition capture tools 940. The partition capture tool of plurality of partition capture tools 940 is determined based on the comparison performed by re-image instructions comparor 935 described herein. In further embodiments of the present technology, captured appliance image generator 950 comprises partition compressor 960. Partition compressor 960 compresses one or more partitions 915a, 915b, and 915c, utilizing one or more of plurality of partition capture tools 940.

Referring to FIG. 9, in one embodiment, captured appliance image storer 965 stores captured appliance image 955 at second location 970. Second location may be stored within ARI 900, external to ARI 900 but internal to data store 110. Furthermore, second location may be on blade 105, but external to data store 100, or on a data store external to blade 105, but accessible by ARI 900.

Referring now to FIG. 10, in one embodiment, ARI 900 includes restore instructions receiver 1005, captured metadata accessor 1015, and appliance image restorer 1025, which all together function to restore a captured appliance image 955 onto second blade 1010.

Restore instructions receiver 1005 receives restore instructions 1007 to restore captured appliance image 955 onto second blade 1010. Restore instructions 1007 may be received from any person or thing capable of sending receivable restore instructions 1007. In another embodiment, captured metadata accessor 1015 accesses captured metadata 1020 at second location 970, wherein captured metadata 1020 comprises captured appliance image 955 and re-imaging instructions 930a, 930b, and 930c.

Referring still to FIG. 10, in one embodiment, appliance image restorer 1025 restores captured appliance image 955 onto second blade 1010. In restoring captured appliance image 955, in one embodiment, the re-imaging instructions 930a, 930b, and 930c are utilized. For example, re-imaging instructions 930a are analyzed. This analysis might reveal that partition capture tool "Q" is to be used to transfer the captured appliance image 955 stored at second location to second blade. Based on this analysis, appliance image restorer 1025 restores captured appliance image 955 utilizing partition capture tool "Q".

Figure 11:
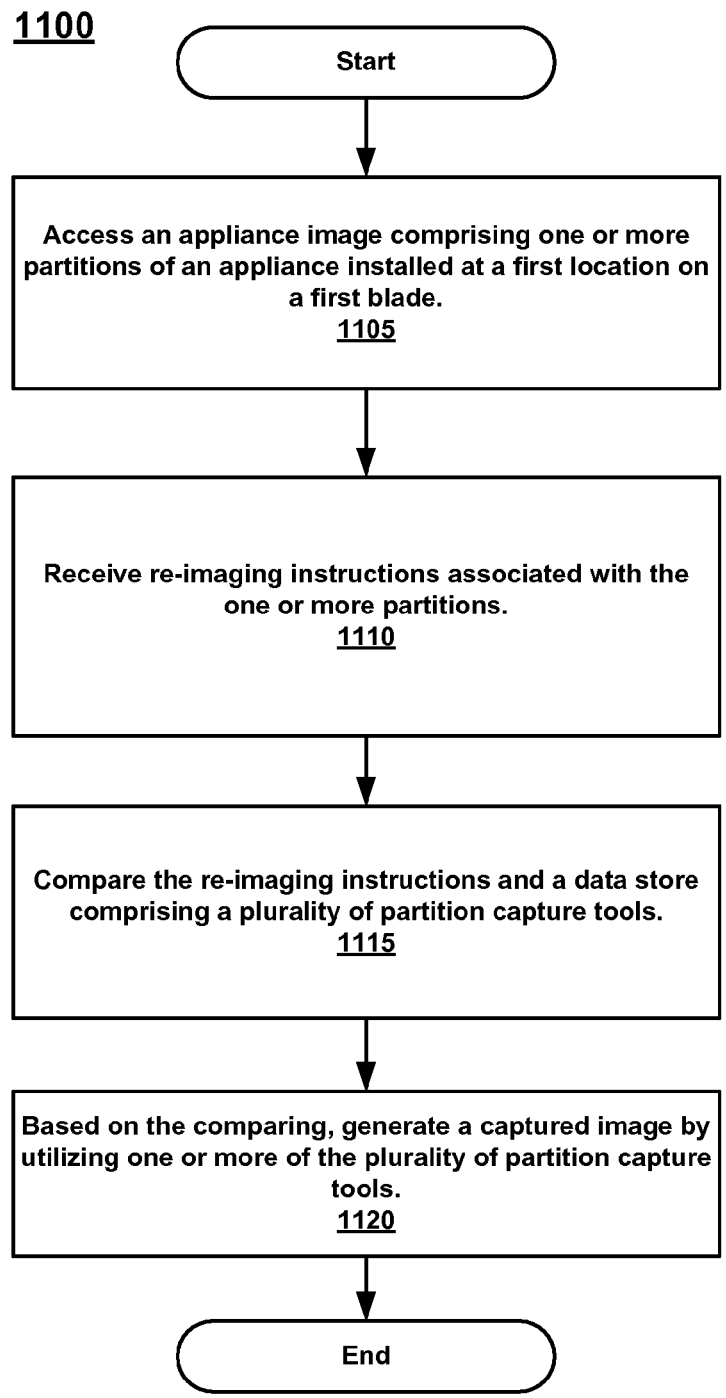
FIG. 11 is a flowchart of an example method for dynamically capturing and restoring an appliance image, in accordance with embodiments of the present technology.

Referring now to 1100 of FIG. 11, a flowchart of an example computer-implemented method for capturing and restoring an appliance image, in accordance with embodiments of the present technology is shown.

Referring to 1105 of FIG. 11 and as described herein, in one embodiment of the present technology, appliance image 910 is accessed. Appliance image 910 comprises one or more partitions 915a, 915b, and 915c of appliance 125a installed at first location 920 on first blade 105 is accessed. Referring to 1110 of FIG. 11 and as described herein, in one embodiment re-image instructions 930a, 930b, and 930c associated with one or more partitions 915a, 915b, and 915c, respectively, is received.

Referring to 1120 of FIG. 11 and as described herein, in one embodiment re-imaging instructions 930a, 930b, and 930c are compared with a data store 110 comprising plurality of partition capture tools 940. Referring now to 1125 of FIG. 11 and as described herein, in one embodiment captured appliance image 955 is generated utilizing one or more of plurality of partition capture tools 940. Captured appliance image 955 is generated based on the comparing performed by re-image instructions comparor 935.

Referring now to 1200 of FIG. 12, a flowchart of an example method for restoring an appliance image, in accordance with embodiments of the present technology is shown. In one embodiment, process 1200 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 1200 is performed by ARI 900 of FIG. 9.

Referring now to 1205 of FIG. 12 and as described herein, in one embodiment, restore instructions 1007 to restore captured appliance image 955 onto a blade, such as second blade 1010, are received. Captured appliance image 955 comprises one or more partitions 915a, 915b, and 915c. Second blade 1010 may be that blade of a customer wishing to purchase appliance 125a from a retailer. Appliance image 910 for appliance 125a may be stored at the retailer's or at a third location.

Referring to 1210 of FIG. 12 and as described herein, in one embodiment captured metadata 1020 is accessed. Captured metadata 1020 comprises captured appliance image 955 and re-imaging instructions 930a, 930b, and 930c. Referring now to 1215 of FIG. 12 and as described herein, in one embodiment, re-imaging instructions 930a, 930b, and 930c are utilized to restore captured appliance image 955 onto a blade, such as second blade 1010.

Thus, embodiments of the present technology enable efficiently capturing and restoring an appliance image by interpreting an appliance as one or more partitions and then applying the available software tools to each partition as needed.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer implemented method of capturing and restoring an appliance image, said method comprising:
   accessing an appliance image comprising one or more partitions of an appliance installed at a first location on a first blade;
   receiving re-imaging instructions associated with said one or more partitions;
   comparing said re-imaging instructions and a data store comprising a plurality of partition capture tools;
   based on said comparing, generating a list of selectable partition capture tools to apply to said one or more partitions; and generating a captured appliance image by utilizing one of said selectable partition capture tools in response to a selection from the list.

2. The method of claim 1, wherein said generating comprises:
compressing said one or more partitions.

3. The method of claim 1, further comprising:
storing said captured appliance image at a second location.

4. The method of claim 1, further comprising:
receiving instructions to restore said captured appliance image onto a second blade;
accessing captured metadata at a second location, said captured metadata comprising said captured appliance image and said re-imaging instructions;
utilizing said re-imaging instructions to restore said captured appliance image onto said second blade, thereby enabling installation.

5. The method of claim 1, further comprising:
utilizing a size of a partition of said one or more partitions to determine which partition capture tool of said plurality of partition capture tools to apply to said partition.

6. The method of claim 1, further comprising:
utilizing a file system type of a partition of said one or more partitions to determine which partition capture tool of said plurality of partition capture tools to apply to said partition.

7. An appliance re-imager for dynamically capturing and restoring an appliance image, said appliance re-imager comprising:
a processor; and
a memory for storing machine readable instructions accessible by said processor, wherein said processor executes said machine readable instructions to implement:
an appliance image accessor configured for accessing an appliance image comprising one or more partitions of an appliance installed at a first location on a first blade;
a re-image instructions receiver configured for receiving re-imaging instructions associated with said one or more partitions;
a re-image instructions comparor configured for comparing said re-imaging instructions and a data store comprising a plurality of partition capture tools;
a partition capture tool list generator configured for generating a list of selectable partition capture tools to apply to said one or more partitions based on said comparing; and
a captured appliance image generator configured for generating a captured appliance image based on said comparing by utilizing one of said selectable partition capture tools in response to a selection from the list.

8. The appliance re-imager of claim 7, wherein said captured appliance image generator comprises:
a partition compressor configured for compressing said one or more partitions.

9. The appliance re-imager of claim 7, further comprising:
a captured appliance image storer configured for storing said captured appliance image at a second location.

10. The appliance re-imager of claim 7, further comprising:
a default list generator configured to generate a list of default partition capture tools to apply to said each of said one or more partitions based on said comparing.

11. The appliance re-imager of claim 7, wherein said re-imaging instructions comprise instructions associated with a partition size for each of said one or more partitions.

12. The appliance re-imager of claim 7, wherein said re-imaging instructions comprise instructions associated with a file system type for each of said one or more partitions.

13. The appliance re-imager of claim 7, wherein said re-imaging instructions comprise updating rules for said appliance.

14. The appliance re-imager of claim 7, further comprising:
a restore instructions receiver configured for receiving instructions to restore said captured appliance image onto a second blade;
a captured metadata accessor configured for accessing captured metadata at a second location, said captured metadata comprising said captured appliance image and said re-imaging instructions; and
an appliance image restorer configured for restoring said captured appliance image onto said second blade.

15. A non-transitory computer usable storage medium comprising instructions that when executed cause a computer system to perform a method for restoring an appliance image, said method comprising:
accessing an appliance image comprising one or more partitions of an appliance installed at a first location on a first blade;
receiving re-imaging instructions associated with said one or more partitions;
comparing said re-imaging instructions and a data store comprising a plurality of partition capture tools;
based on said comparing, generating a list of selectable partition capture tools to apply to said one or more partitions; and
generating a captured appliance image by utilizing one of said selectable partition capture tools in response to a selection from the list.

16. The non-transitory computer usable storage medium of claim 15, said method further comprising:
receiving restore instructions to restore a captured appliance image onto a blade, wherein said captured appliance image comprises one or more partitions;
accessing captured metadata comprising said captured appliance image and re-imaging instructions associated with said one or more partitions; and
utilizing said re-imaging instructions to restore said captured appliance image onto said blade.

17. The non-transitory computer usable storage medium of claim 16, wherein said utilizing said re-imaging instructions further comprises:
analyzing said re-imaging instructions; and
restoring said captured appliance image onto said blade according to said re-imaging instructions.

* * * * *